(12) United States Patent
Shimizu (10) Patent No.: US 7,658,253 B2
(45) Date of Patent: Feb. 9, 2010

(54) STRADDLE-TYPE VEHICLE

(75) Inventor: Masafumi Shimizu, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 530 days.

(21) Appl. No.: 11/737,584

(22) Filed: Apr. 19, 2007

(65) Prior Publication Data

US 2007/0249220 A1    Oct. 25, 2007

(30) Foreign Application Priority Data

Apr. 20, 2006    (JP) ............................. 2006-116524

(51) Int. Cl.
*B62K 11/00*    (2006.01)
*B62J 17/00*    (2006.01)

(52) U.S. Cl. ...................... 180/219; 296/78.1

(58) Field of Classification Search ................ 180/219, 180/218, 220; 296/78.1, 181.1, 181.5, 81–83
See application file for complete search history.

(56) References Cited

U.S. PATENT DOCUMENTS

| | | | | |
|---|---|---|---|---|
| 4,697,842 A | * | 10/1987 | Kawasaki | ................. 296/78.1 |
| 4,709,774 A | * | 12/1987 | Saito et al. | .................. 180/229 |
| 6,923,489 B2 | * | 8/2005 | Keys | .......................... 296/77.1 |
| 7,401,953 B2 | * | 7/2008 | Isayama | ..................... 362/474 |
| 2007/0228764 A1 | * | 10/2007 | Shimizu et al. | ............ 296/78.1 |
| 2007/0240924 A1 | * | 10/2007 | Kurihara | ..................... 180/219 |
| 2008/0202835 A1 | * | 8/2008 | Suita et al. | ................... 180/219 |
| 2008/0203698 A1 | * | 8/2008 | Suita | ........................... 280/276 |

FOREIGN PATENT DOCUMENTS

JP    4-002149    1/1992

\* cited by examiner

*Primary Examiner*—Tony H. Winner
(74) *Attorney, Agent, or Firm*—Hogan & Hartson LLP

(57) ABSTRACT

A straddle-type vehicle with improved meter viewability and easier handle assembly. A handle cover covers a handle, and a meter unit is attached to the handle cover. The meter unit includes a side surface that extends upward from an upper surface of the handle cover, and a lens that covers a meter formed in an upper section of the side surface. An upper end of the meter unit is positioned above an upper end of the handle cover.

14 Claims, 12 Drawing Sheets

STRADDLE-TYPE VEHICLE

RELATED APPLICATIONS

This application claims the benefit of priority under 35 USC 119 of Japanese patent application no. 2006-116524, filed on Apr. 20, 2006, which application is hereby incorporated by reference in its entirety.

BACKGROUND OF THE INVENTION

1. Field of the Invention

The present invention relates to a straddle-type vehicle, and more particularly to a straddle-type vehicle in which a meter unit is attached to a handle.

2. Description of Related Art

Normally, in a straddle-type vehicle, a meter unit including a speedometer and the like is attached to a handle. For example, in JP-UM-B-4-2149, an integrated tray and a meter are assembled to an upper section of a handle. The tray and meter are formed as an integrated unit, and then, in order to ensure assembly strength without using a bracket or the like, a handle cover and the handle are joined together, and the handle cover and meter are joined together.

However, since the meter and cover of JP-UM-B-4-2149 are formed as an integrated unit, when the rider moves his/her line of sight in the direction of the handle, the rider may not immediately see the meter. In addition, the assembly operation requires attaching the front cover to the handle, then attaching a lens and the meter to the front cover, and then attaching a rear cover to the meter and the handle. As a result, it is difficult to provide the working space necessary for performing the assembly operation, and the assembly operation is complicated.

SUMMARY OF THE INVENTION

The invention addresses these problems and provides a straddle-type vehicle that includes a handle member that can be easily attached, and a meter that has excellent viewability.

A straddle-type vehicle according the invention includes a handle cover that covers a handle; and a meter unit that is attached to the handle cover. The meter unit includes a side surface that extends upward from an upper surface of the handle cover, and a lens that covers a meter formed in an upper section of the side surface. An upper end of the meter unit is positioned above an upper end of the handle cover.

The upper surface of the handle cover is positioned in an upper section of the vehicle body, and the meter unit protrudes from this upper surface. Accordingly, when the rider moves his/her line of sight in the direction of the handle cover, he/she can immediately view the meter unit and thus viewability is improved.

An upper section of the meter unit may be located further to the rear side of the vehicle body than a lower section of the meter unit. More specifically, the meter unit may protrude toward the rear side of the vehicle body from the upper surface of the handle cover, thereby orienting the upper section of the meter unit toward the direction of the head of the rider and allowing the meters to be viewed more easily.

Moreover, the meter unit may extend in a direction in parallel with the steering shaft. In a straddle-type vehicle, the direction in which the vehicle travels is determined by rotary motion of the handle, which is connected to the steering shaft, being transmitted to the front wheel, a ski or the like. Generally, a lower end of the steering shaft is positioned at a front side of the vehicle body, and the upper end of the steering shaft is positioned at a rear side of the vehicle body, such that the steering shaft is inclined toward the rear side of the vehicle body.

Thus, the angle of inclination of the steering shaft with respect to the horizontal direction is comparatively nearer to the angle of inclination of the direction of the line of sight of the rider when he/she looks in the direction of the handle with respect to the horizontal direction. As a result, if the extension direction of the meter unit is set to be the same as the extension direction of the steering shaft, the protrusion directions of the steering shaft and the meter unit are parallel, which in turn allows the handle member of the straddle-type vehicle to have an impression of design unity and allows excellent viewability to be ensured.

In addition, the upper end of the lens is positioned above the upper end of the handle cover to ensure that excellent viewability is maintained. So long as this positional relationship exists, the position of the upper end of the lens may be modified. For example, if a center point of the lens is positioned above the upper end of the handle cover, it is possible to ensure even more outstanding viewability.

In one embodiment, the handle cover includes a front side cover and a rear side cover. One of the front and rear side covers includes an attachment portion that is used to attach the meter unit.

In another embodiment, the attachment portion is formed such that attachment of the meter unit can be performed from the inner side of the handle cover.

In another embodiment, a meter unit side mating surface, which is oriented in a determined direction, is formed in the lower end of the side surface, and a cover side mating surface is formed in one of the front and rear side covers. The cover side mating surface has generally the same shape as the meter unit side mating surface. The cover side mating surface is parallel with the direction of movement of the front side cover and the rear side cover when the covers are aligned.

In another embodiment, the meter unit side mating surface and the cover side mating surface are parallel with a vehicle front-rear direction when the front side cover and the rear side cover are in an aligned state.

An assembly method for assembling a handle member in which a meter unit, and a handle cover including a first handle cover and a second handle cover are assembled to a handle of a straddle-type vehicle is also provided. The assembly method includes: forming a first mating surface and a second mating surface on a lower end of the meter unit, the first mating surface forming a boundary with the first handle cover, and the second mating surface forming a boundary with the second handle cover; forming a cover side mating surface that faces the second mating surface on the second handle cover; attaching the meter unit to the first handle cover while the first mating surface is aligned with an upper surface of the first handle cover; attaching the first handle cover with the attached meter unit to the handle; and moving the second handle cover in a direction that is parallel to the second mating surface while the cover side mating surface is facing the second mating surface such that the second handle cover is attached to the first handle cover.

The invention allows assembly of the handle member to be performed while the meter unit is placed in a state in which it protrudes form the handle cover, and provides a meter unit that has excellent viewability. In addition, the handle cover may be separated into sections, and the meter unit first attached to one of these sections. Accordingly, the invention provides a handle cover that can be assembled and maintained easily.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiments of the invention are now explained with reference to the drawings. The invention is not limited to the following embodiments.

(1) Structure of the Straddle-type Vehicle

Figure 1:
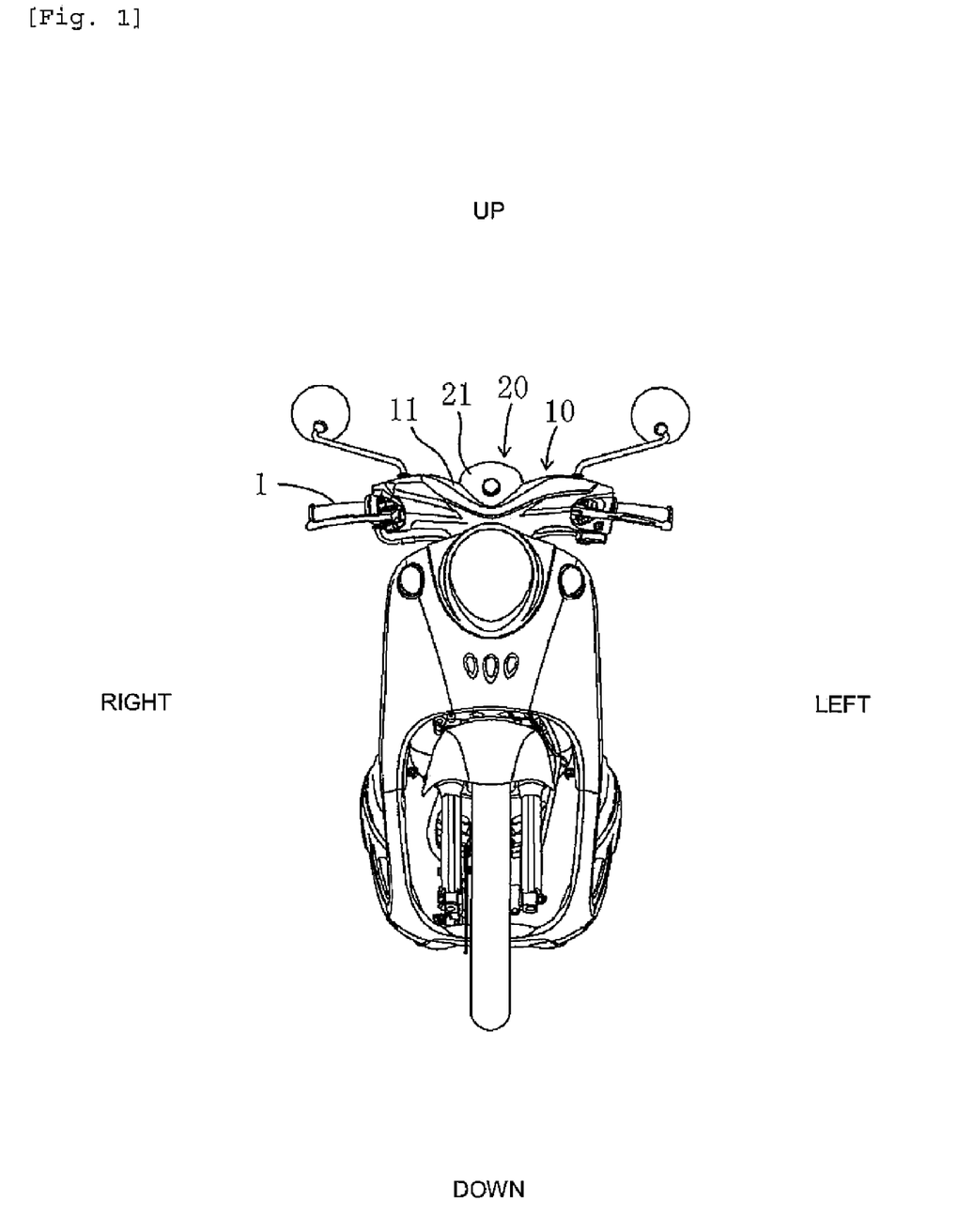
FIG. 1 is a front view of a straddle-type vehicle according to an embodiment of the invention.
Figure 2:
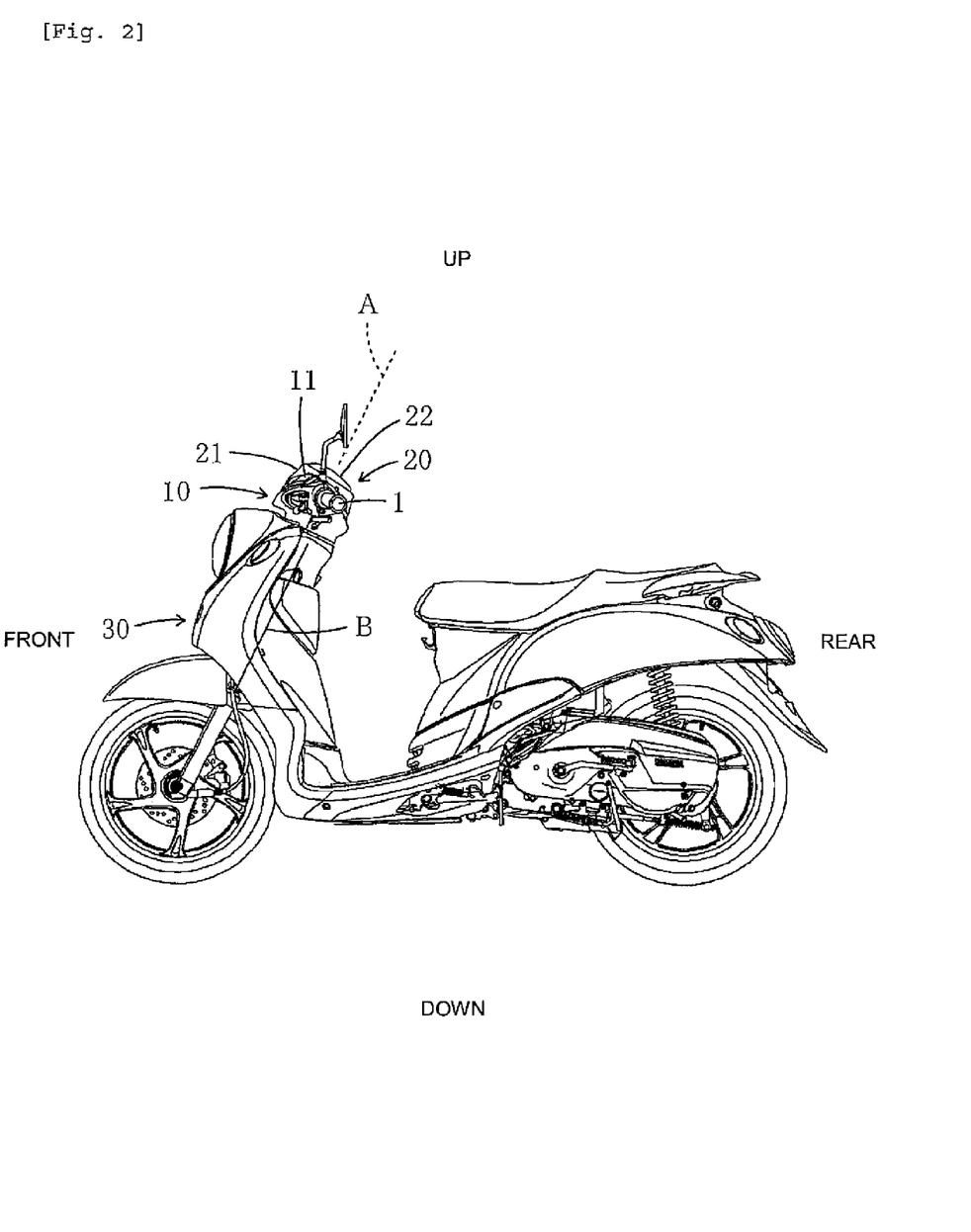
FIG. 2 is a left side view of the straddle-type vehicle.

FIGS. 1 and 2 are front and left side views of a straddle-type vehicle according to an embodiment of the invention. Directions referred to herein are from the perspective of a rider seated on the vehicle. A "front-rear" direction corresponds to a traveling direction of the vehicle in a plane that is parallel to a horizontal direction, a "left-right" direction corresponds to the left and right of the rider, and an "up-down" direction corresponds to a vertical direction relative to the vehicle.

A handle 1 positioned at a front and upper section of the vehicle is covered by a handle cover 10. A meter unit 20 is attached to a central upper section of handle cover 10 and has a generally tubular outer periphery. A lens 22 is provided at and protrudes outwards from an upper section of meter unit 20. Meter unit 20 includes a resin made side surface 21, and a meter mechanism including meters like a speedometer and lens 22 attached to its inner surface. Lens 22 is transparent such that it is possible to see inside of lens 22.

Side surface 21 extends upward from an upper surface 11 of handle cover 10 along a vertical plane. Alternatively, side surface 21 may be inclined with respect to the vertical plane with an inclination that is within a 90° range. A section that connects an upper end of side surface 21 and lens 22 is formed as a curved and contoured surface.

A lower end of meter unit 20 has generally the same shape as upper surface 11 of handle cover 10. Meter unit 20 protrudes from upper surface 11 of handle cover 10. Accordingly, when a rider looks in the direction of handle cover 10, lens 22 in the upper section of meter unit 20 appears to rise up from handle cover 10. As a result, meter unit 20 is positioned near the line of sight of the rider without having to raise handle cover 10 upward. Thus, very good viewability is ensured while the front projected area is kept small.

Figure 3:
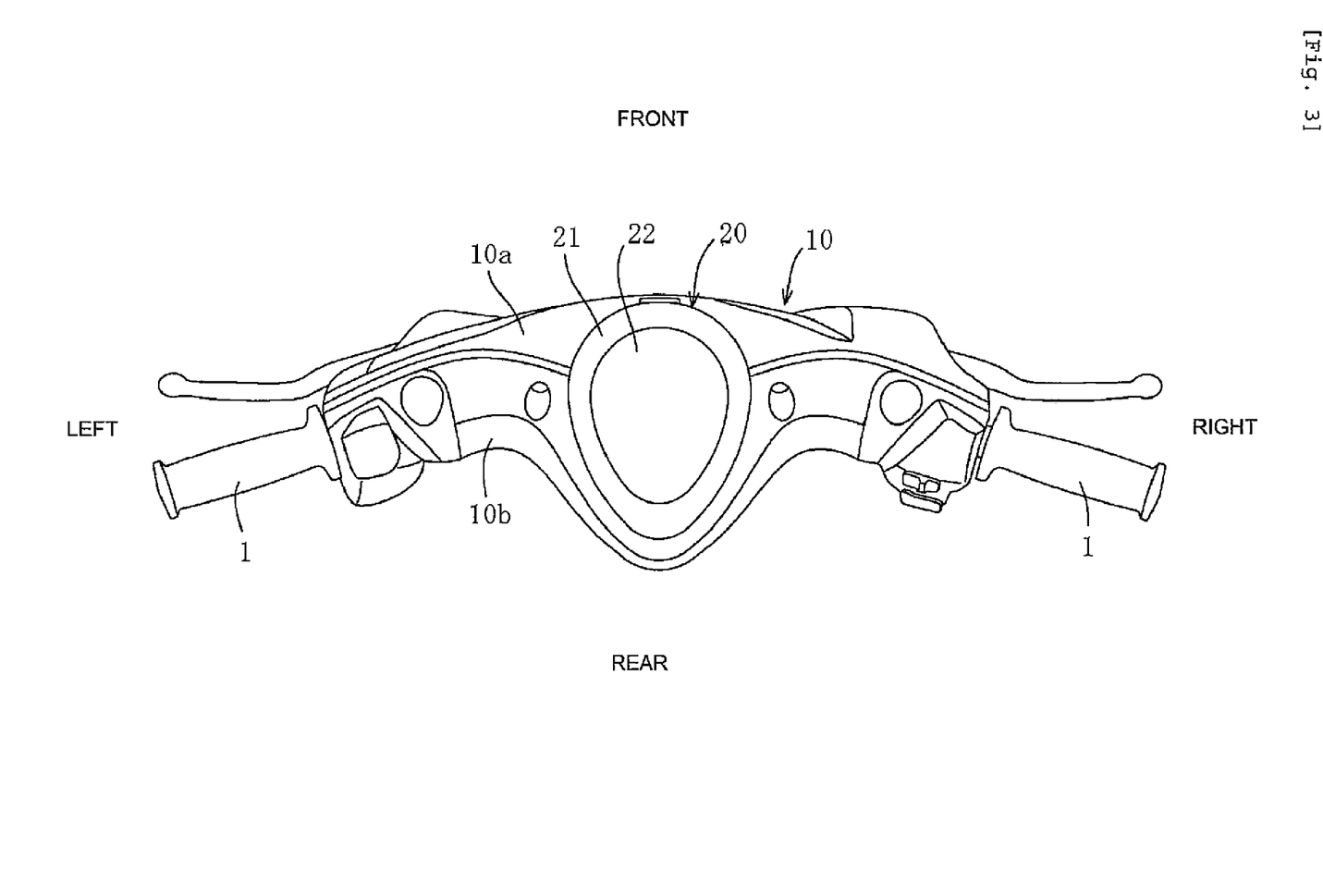
FIG. 3 is a view of a handle cover of the straddle-type vehicle as viewed along axis A of FIG. 2 from above.

Meter unit 20 protrudes upward and rearward from the front side of the vehicle. In other words, an axis A that passes through the center of a cylinder that surrounds side surface 21 of meter unit 20 inclines upward and rearward, and extends in parallel with an extension of a steering shaft B that transmits operation of handle 1 to a front wheel. FIG. 3 is a view of handle cover 10 along axis A from above. Axis A corresponds substantially to the line of sight of the rider. Accordingly, lens 22 can be viewed immediately if the rider moves his/her line of sight. In addition, the meter can be viewed by looking in a generally perpendicular direction at the surface in lens 22 on which the meter is attached. As a result, meter unit 20 has excellent viewability.

Handle cover 10 is formed by joining two front-back members, and, as will be described, meter unit 20 is attached to a rear side cover. Accordingly, when the handle cover is assembled, meter unit 20 is first attached to the rear side cover, then the rear side cover with the attached meter unit 20 is attached to handle 1, and finally a front side cover is attached.

Accordingly, meter unit 20 and handle cover 10 can be attached extremely easily. Furthermore, work carried out on cables inside handle cover 10 can be performed by just removing the front side cover. Thus, an extremely large working space is attained without a large-scale disassembly operation.

Because meter unit 20 and handle cover 10 are separate members, they may be formed in different colors and provided in various color combinations. Furthermore, the designs of meter unit 20 and/or handle cover 10 are easily modified, and changes such as slight design modifications are possible for different shipment destinations or the like.

(2) Structure of the Handle Cover

The structure of handle cover 10 is now described in more detail. Handle cover 10 includes a front side cover 10a and a rear side cover 10b. FIGS. 4-9 depict front and rear side covers 10a and 10b.

Figure 4:
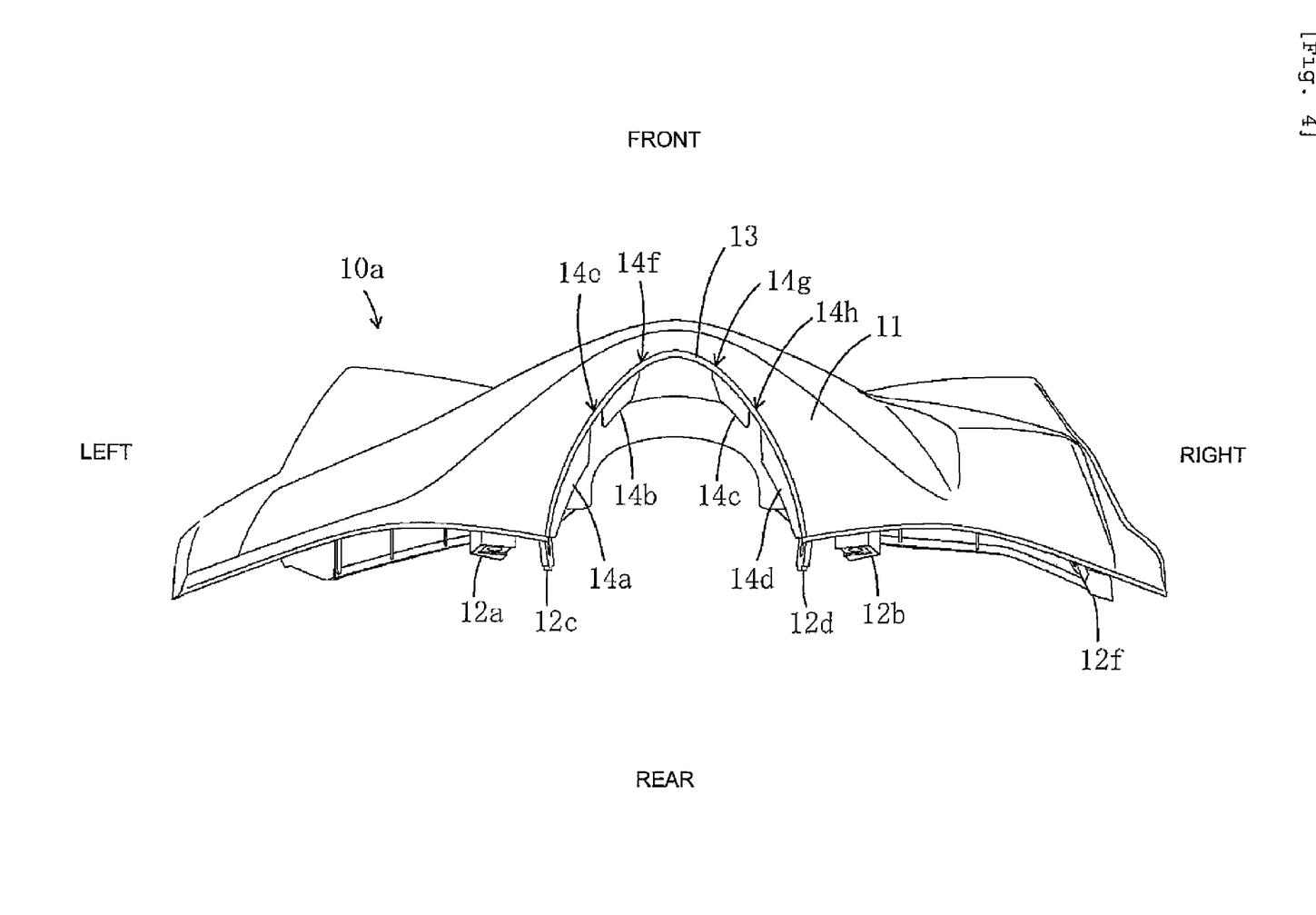
FIG. 4 is a top view of a front side cover of the handle cover.
Figure 5:
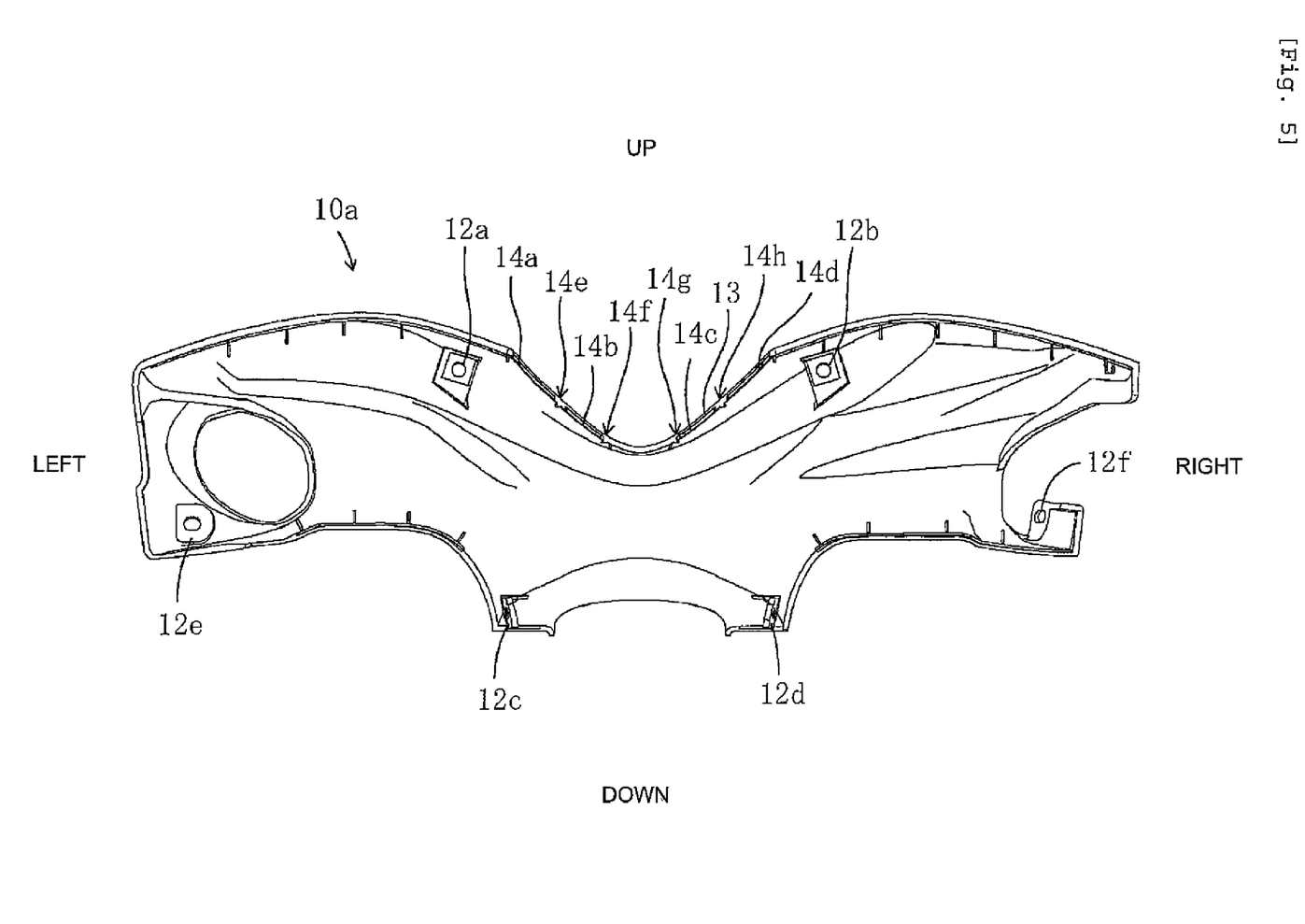
FIG. 5 is a rear view of the front side cover.
Figure 6:
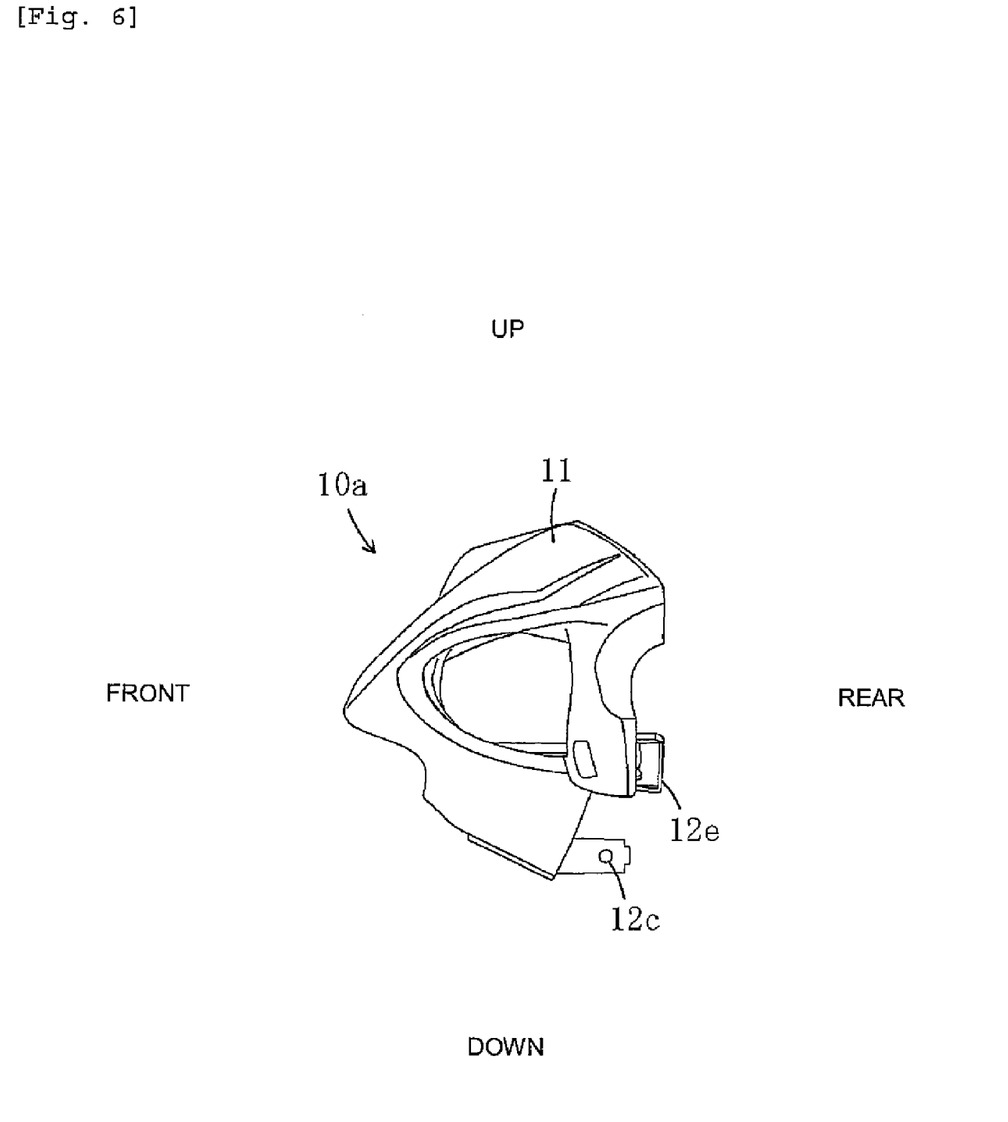
FIG. 6 is a left side view of the front side cover of FIG. 5.

Front side cover 10a comprises substantially the front half of handle cover 10, and extends to the left and right to cover the majority of handle 1 with the exception of a grip section. Front side cover 10a protrudes furthest forward at a generally central section in the left-right and up-down directions. A surface of front side cover 10a above this protruding section extends upwards from the front to the rear and forms upper surface 11 of handle cover 10. A surface of front side cover 10a below the protruding section extends downwards from the front to the rear.

Attachment portions 12a-12f are formed at the rear side of front side cover 10a with holes to secure front and rear side covers 10a and 10b using screws. Front side cover 10a is not provided with a section that is secured by screwing to meter unit 20. Thus, with regard to the relationship of front side cover 10a and the members that structure the handle member, front side cover 10a is only formed with the attachment section to rear side cover 10b. Accordingly, front side cover 10a can be removed from the members that structure the handle member simply by unscrewing the screws.

A notch, which is concave toward the front, is formed in a central section of upper surface 11 of front side cover 10a. A rear side edge of this notch forms a mating surface 13. Mating surface 13 is formed to face a mating surface 25 on the lower end of meter unit 20. Mating surface 13 expands from the front side of the vehicle toward the rear side and from the center toward the left and right edges. Mating surface 13 also extends from the lower side to the upper side.

A surface at the vehicle upper side of mating surface 13 is formed to be parallel with the traveling direction of the vehicle. Accordingly, front side cover 10a can be moved while mating surface 13 and the mating surface of meter unit 20, described later, are placed facing each other. As a result, front side cover 10a easily slides in the vehicle front-rear direction in order to perform positioning when attaching front side cover 10a to rear side cover 10b. More specifically, front side cover 10a is moved while the mating surface of meter unit 20 and mating surface 13 face each other until front side cover 10a matches up with rear side cover 10b, whereby the screw holes of attachment portions 12a-12f and screw holes of rear side cover 10b are aligned with each other.

Ribs 14a-14d are formed in front side cover 10a at the lower side of mating surface 13 in order to allow reliable positioning when aligning front side cover 10a with rear side cover 10b, and to inhibit relative up-down movement of meter unit 20 and front side cover 10a. Ribs 14a-14d protrude in a thin tabular shape at the lower side of mating surface 13 and extend in the vehicle front-back direction. The thickness of the resin of the lower section of mating surface 13 between ribs 14a-14d is roughly constant.

Ribs formed in a lower section of meter unit 20 can be inserted into attachment portions 14e-14h provided between ribs 14a-14d. Thus, when front side cover 10a and rear side cover 10b are aligned, both members can be aligned while being positioning such that there is no misalignment in the left-right or up-down directions. The ribs of meter unit 20 also engage the lower section of mating surface 13, whereby meter unit 20 and front side cover 10a are inhibited from relative up-down movement.

Figure 7:
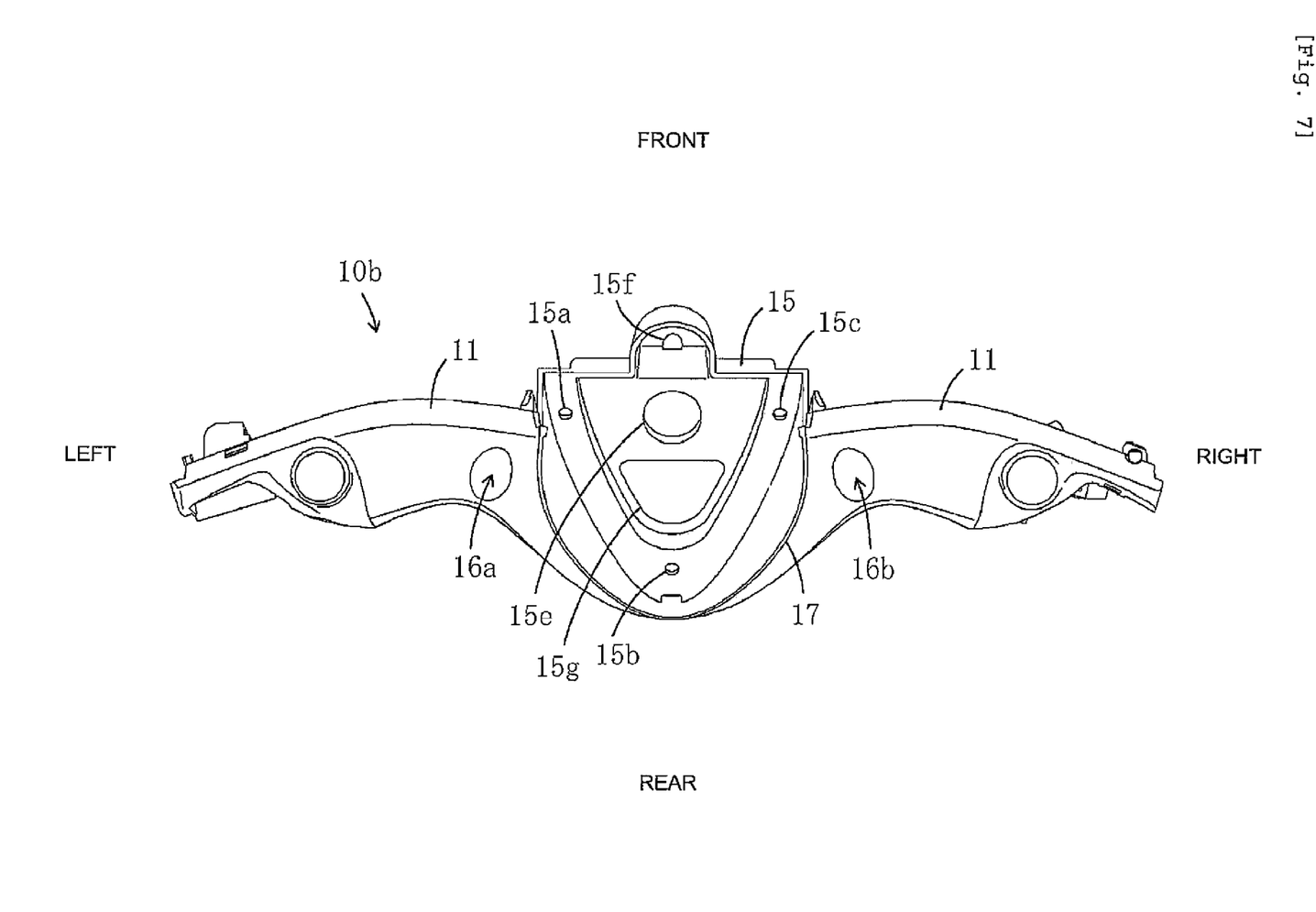
FIG. 7 is a top view of a rear side cover of the handle cover.
Figure 8:
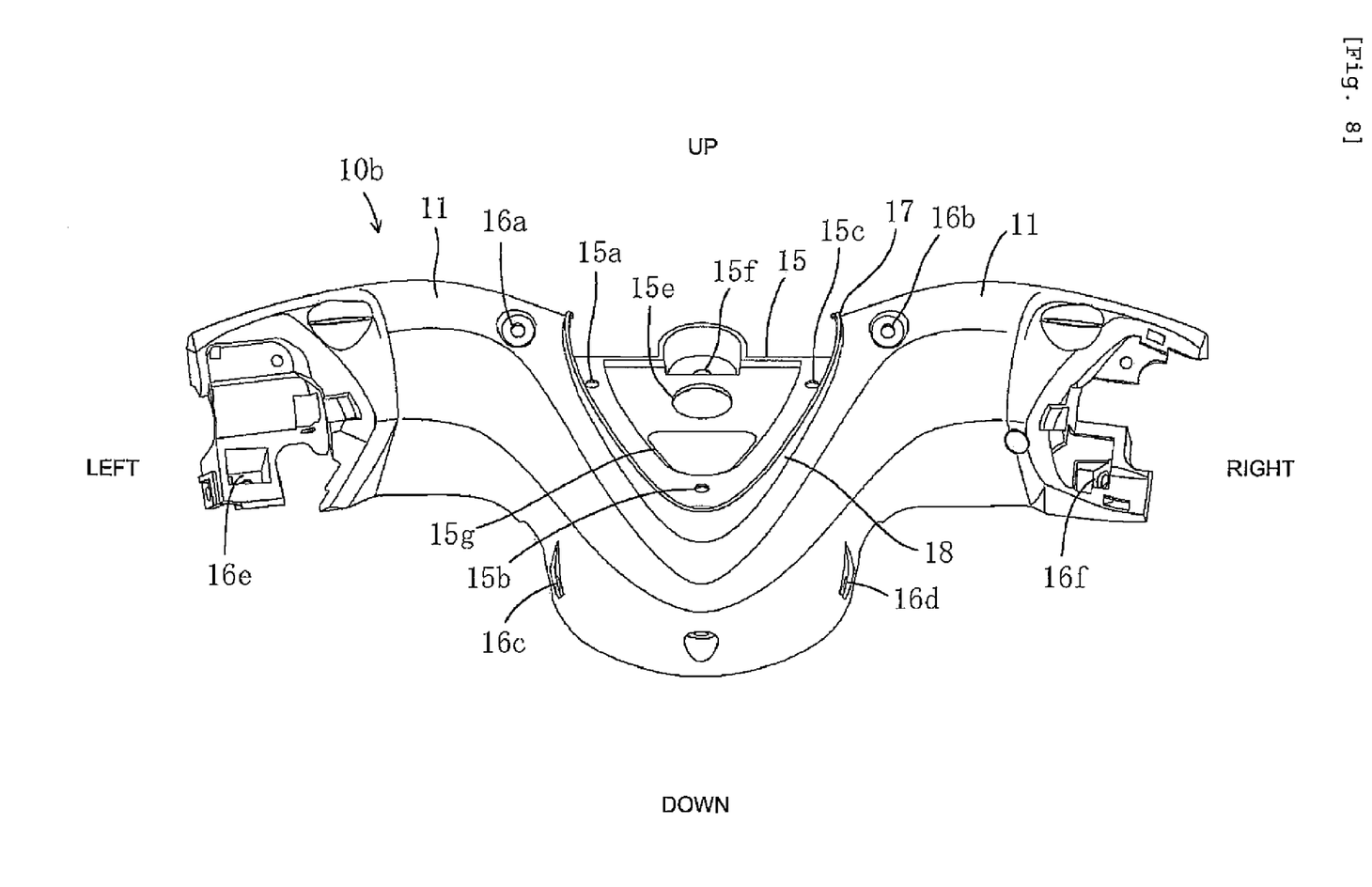
FIG. 8 is a rear view of the rear side cover.
Figure 9:
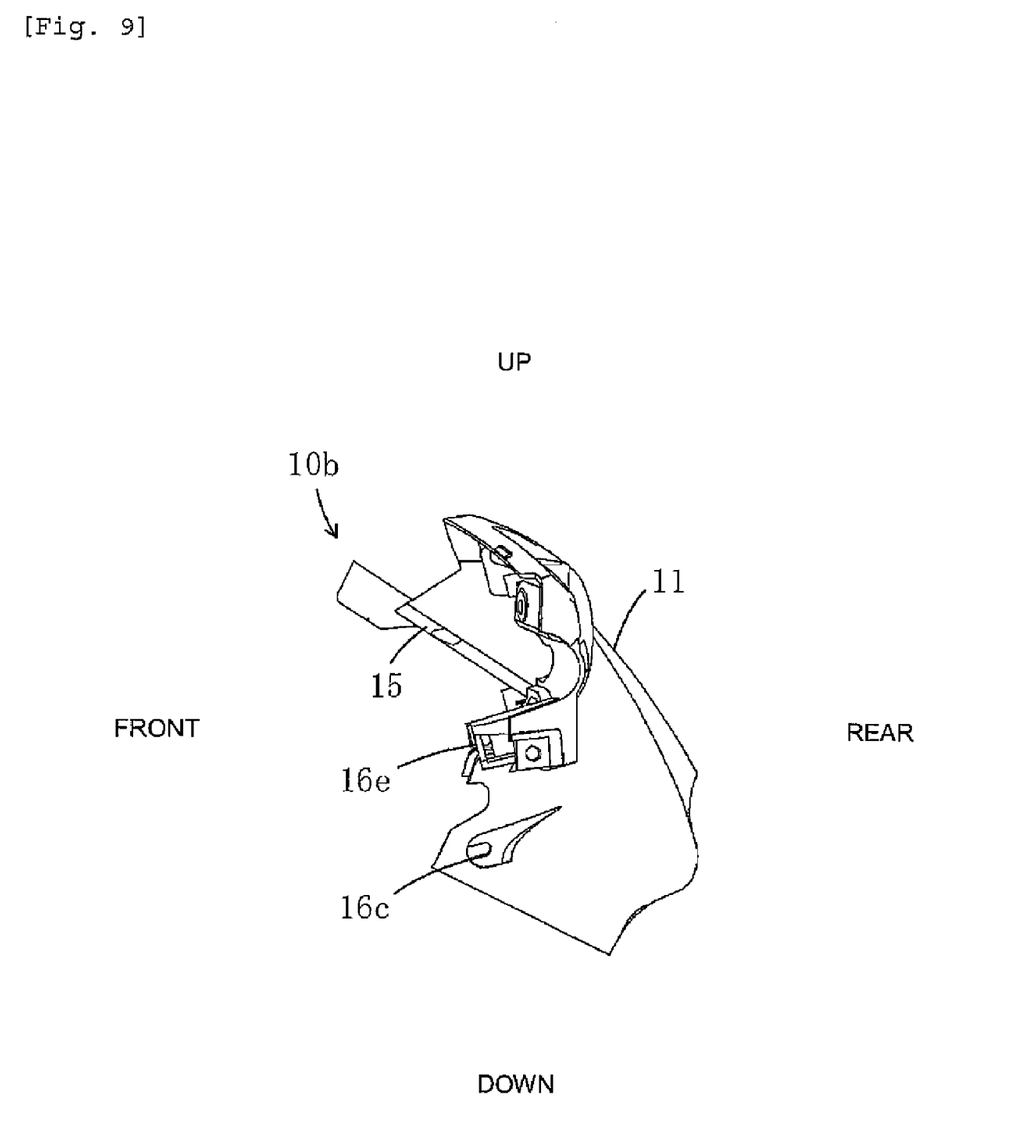
FIG. 9 is a left side view of the rear side cover of FIG. 8.

Rear side cover 10b comprises roughly the rear half of handle cover 10, and extends to the left and right to cover the majority of handle 1 with the exception of the grip section. End surfaces in the up-down and left-right directions have generally the same shape as end surfaces in the up-down and left-right directions of front side cover 10a. Rear side cover 10b and front side cover 10a are aligned to form the handle cover that covers the majority of handle 1. Accordingly, the majority of handle 1 with the exception of the grip is covered, which facilitates low cost production since it is not necessary, as is usually the case, to perform an advanced surface treatment on the majority of the metal-made handle.

Attachment portions 16a-16f are formed in the vehicle front side of rear side cover 10b and are formed with holes to secure rear side cover 10b to front side cover 10a using screws.

Rear side cover 10b protrudes furthest rearward at a generally central section in the left-right and up-down directions. A surface of rear side cover 10b above this protruding section extends upwards from the rear to the front and forms upper surface 11 of handle cover 10. A seat 15 is formed at the upper portion of the rear side protruding section, and used to attach meter unit 20. A mating surface 17 that is aligned with the lower end of meter unit 20 is provided around seat 15.

Attachment portions 15a-15c that function as screw holes are formed at three locations in seat 15. A boss formed at the lower section of meter unit 20 is aligned, and then meter unit 20 is secured to seat 15 using screws while the lower end of meter unit 20 and mating surface 17 face each other.

Holes 15e, 15f and 15g are formed in seat 15. Hole 15e allows a cable that extends from meter unit 20 to pass to the front side of the vehicle. Holes 15f, 15g allow operation of buttons that are provided on the lower surface of meter unit 20 for performing various types of adjustments. Accordingly, if front side cover 10a is removed when rear side cover 10b is attached to handle 1 and meter unit 20 is attached to rear side cover 10b, various types of adjustments to meter unit 20 through holes 15e-15g of seat 15 can be performed from the front side of the vehicle.

As can be seen in FIGS. 7-9, the front side of seat 15 is inclined so as to be positioned at an upper side, and the rear side of seat 15 is inclined so as to be positioned at a lower side. Thus, holes 15e-g open in upward and rearward directions when viewed from the front side of the vehicle. Thus, extremely good workability when the above-described adjustments are performed is ensured. Rear side cover 10b is provided with an attachment section, not shown, for attachment to handle 1 using screws or the like.

(3) Structure of the Meter Unit

Figure 10:
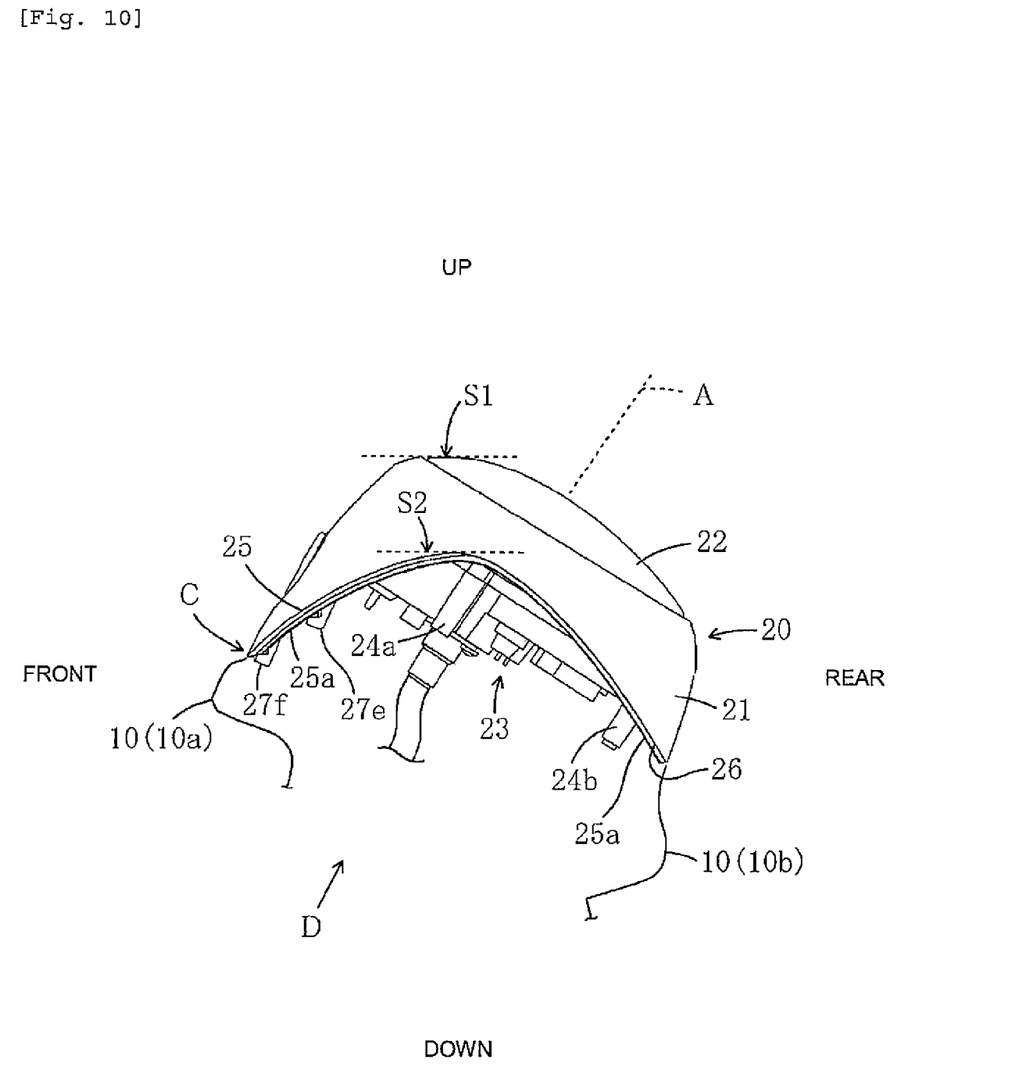
FIG. 10 is a left side view of a meter unit attached to the handle cover.
Figure 11:
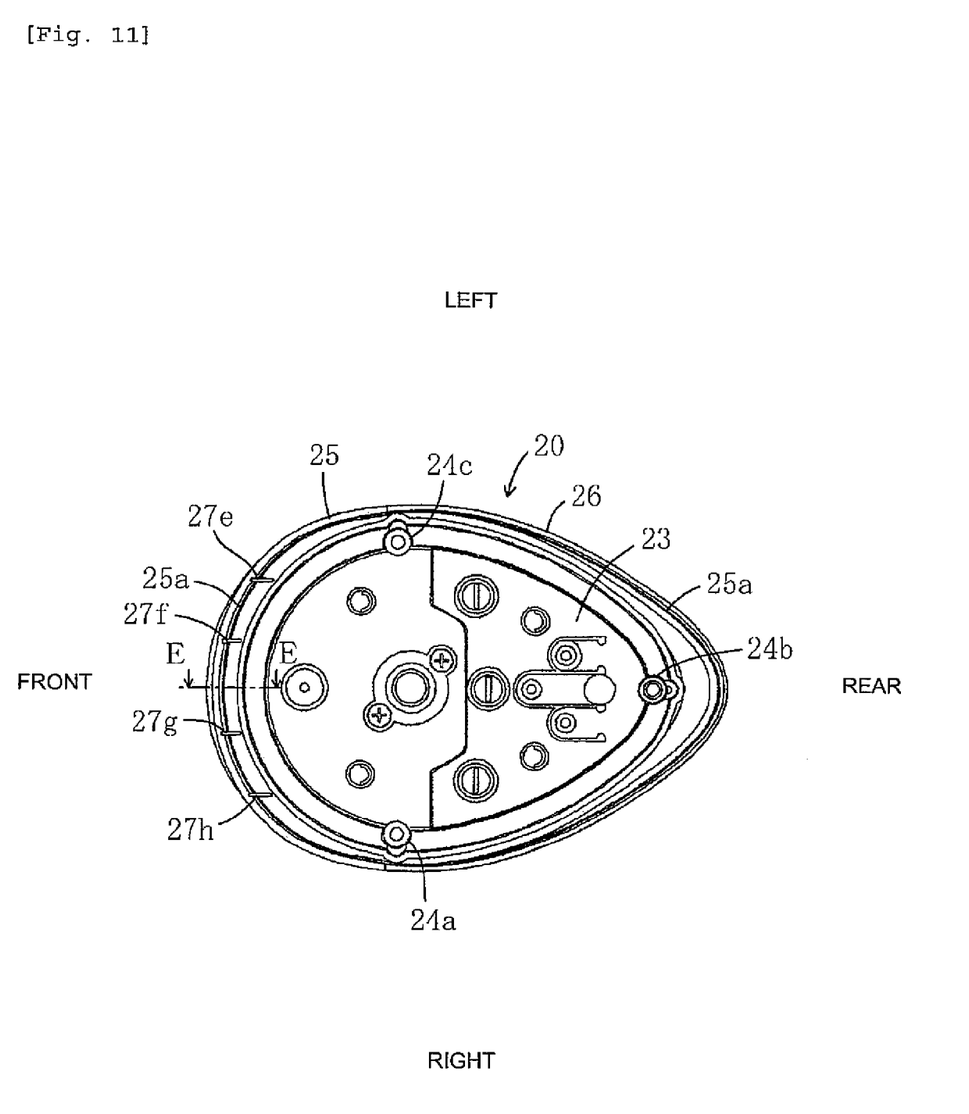
FIG. 11 is a bottom view of the meter unit.

The structure of meter unit 20 is now explained in detail. FIG. 10 is a left side view of meter unit 20 attached to handle cover 10. FIG. 11 is a bottom view of meter unit 20 (from direction D). In FIG. 10, the front section of front side cover 10a and the rear section of rear side cover 10b at the lower side of meter unit 20 are indicated with a solid line. Meter unit 20 is provided with side surface 21 and lens 22. Meter unit 20 has a generally oval shape when viewed in a cross section perpendicular to hypothetical axis A in the center (position of the center of gravity) of a section surround by the outer periphery of the generally tubular shape formed by side surface 21.

Lens 22 is attached to a meter mechanism 23 that includes a speedometer and the like. Meter mechanism 23 is attached to the inner side of side surface 21 with lens 22 attached. Bosses 24a-24c are formed on the lower side of meter mechanism 23 at positions that correspond to attachment portions 15a-15c. Each boss 24a-24c is aligned with and secured to each attachment portion 15a-15c using screws, whereby meter unit 20 is attached to seat 15.

When meter unit 20 is attached to seat 15, and front side cover 10a is aligned with rear side cover 10b, side surface 21 extends generally in the direction of axis A from upper surface 11 of handle cover 10. Accordingly, meter unit 20 protrudes from the upper and front side of handle cover 10 toward the rear side. In addition, lens 22 protrudes to the upper side of meter unit 20 at the upper section of side surface 21. An upper edge S1 of lens 22 is positioned to be above an upper edge S2 of upper surface 11 when meter unit 20 is attached to handle cover 10.

Thus, when the rider moves his/her line of sight toward the direction of the handle, lens 22 of meter unit 20 appears to rise upwards and to the rider's side from handle cover 10, which allows the rider to immediately view the speedometer and the like inside lens 22 when moving his/her line of sight. As a result, meter unit 20 offers extremely good viewability. Axis A extends generally parallel to steering shaft B. As a result, as shown in FIG. 2, the front section of the vehicle inclines in one direction as an integrated unit from meter unit 20 to the front wheel through a leg shield 30. Accordingly, excellent viewability and an impression of design unity is achieved simultaneously.

The lower end of meter unit 20 matches the shape of handle cover 10. More specifically, in meter unit 20, the lower end is formed to run from the downward side to the upward side as it extends from the front side to the rear side. The lower end is positioned in the most upward point in the vicinity of the position where front side cover 10a and rear side cover 10b align. To the rear side of this most upward point, the lower end is formed to extend to the lower side from the upper side. Moreover, in meter unit 20, the lower end is at the upper side at the left and right sides, and then the lower end extends downward as it runs from the left and right sides toward the center.

The shape of the lower end of meter unit 20 as described above matches upper surface 11 of handle cover 10. Mating surface 25 that faces mating surface 13 and mating surface 26 that faces mating surface 17 are formed in the lower end of meter unit 20.

Figure 12:
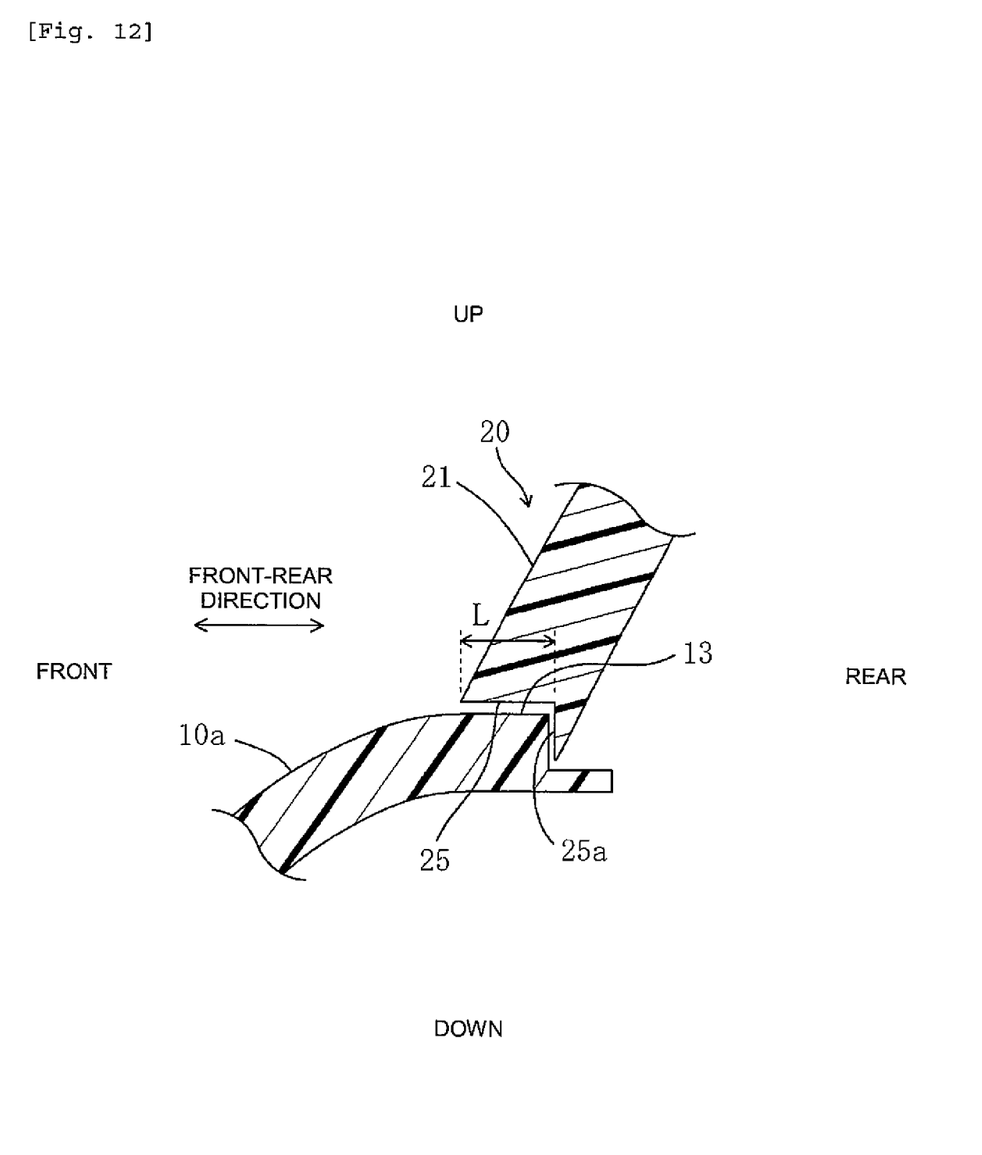
FIG. 12 is a partial cross sectional view of the meter unit taken along line E-E of FIG. 11.

Mating surface 25 corresponds with the upper surface of mating surface 13 of front side cover 10a, and the surface of the lower side of mating surface 25 is formed to be parallel with the front-rear direction of the vehicle. More specifically, mating surface 25 is formed such that, when meter unit 20 is cut along a chosen cross section that is parallel with the up-down/front-rear direction, the lower side of mating surface 25 has a depth dimension of a determined length that is parallel with the front-rear direction of the vehicle. For example, FIG. 12 is an enlarged cross sectional view in the vicinity of arrow C of FIG. 10 cut along a plane parallel to the up-down/front-rear direction (cross section E-E of FIG. 11). As can be seen in FIG. 12, the lower side of mating surface 25 has a depth dimension with length L.

As can also be seen in FIG. 12, mating surfaces 13 and 25 are parallel to the front-rear direction of the vehicle. Accordingly, the relationship of the mating surfaces is maintained along the entire surface of mating surface 25. Thus, if meter unit 20 is cut along a chosen cross section that is parallel with the up-down/front-rear direction, mating surface 25 always has a determined depth dimension in the front-rear direction.

As a result, front side cover 10a can be moved from the front to the rear side, while mating surfaces 13 and 25 are facing each other with meter unit 20 attached to rear side cover 10b, without interference between meter unit 20 and front side cover 10a, and to abut front side cover 10a with rear side cover 10b.

In addition, as a result of mating surface 25 having depth dimension in the vehicle front-rear direction, when front side cover 10a is abutted against rear side cover 10b, mating surface 13 is constantly positioned to the lower side of mating surface 25, and thus no gap exists between meter unit 20 and mating surface 25. In particular, when a rider looks at the front of meter unit 20, there does not appear to be any gap between meter unit 20 and front side cover 10a, and thus appearance is not impaired.

Furthermore, mating surface 25 joins smoothly with mating surface 26 in the vicinity of upper edge S2 (FIG. 10). It is not necessary to provide the depth dimension of the determined length that extends parallel with the front-rear direction of the vehicle at the lower side of mating surface 26 when meter unit 20 is cut along a chosen cross section that is parallel with the up-down/front-rear direction.

More specifically, meter unit 20 is attached to seat 15 before rear side cover 10b is attached to handle 1. Accordingly, when performing attachment, there is a great degree of freedom in terms of selecting the direction in which both members are brought together, and thus is possible to bring meter unit 20 toward rear side cover 10b along axis A shown in FIG. 10. As a result, the embodiment is formed such that just mating surface 26 and mating surface 17 face each other. With this configuration, mating surface 17 is formed in the upper section of a side surface 18 (FIG. 8) that protrudes from upper surface 11 of rear side cover 10b. Side surface 18 and side surface 21 of meter unit 20 are formed to be continuous. Accordingly, a structure in which the rider cannot see a hole is provided.

In addition, an entry inhibiting rib 25a that inhibits water, sand, and the like from entering inside handle cover 10 is provided at the inside of meter unit 20 from mating surfaces 25 and 26. Rib 25a protrudes downward from mating surfaces 25 and 26.

Ribs 27e-27h are formed at the lower section of the front side of meter unit 20, and sandwich attachment portions 14e-14h between ribs 14a-14d formed at the lower side of mating surface 13. Each rib 27e-27h protrudes downward from the lower section of meter unit 20, and curves, substantially in a right angle, to protrude forward. An upper surface of the section that curves and protrudes forward extends parallel to the front-rear direction of the vehicle as shown in FIG. 10. Accordingly, when meter unit 20 is attached to rear side cover 10b, front side cover 10a can be moved from the front to the rear side while facing ribs 27e-27h toward attachment portions 14e-h to position mating surface 13 beneath mating surface 25 while also aligning front side cover 10a and rear side cover 10b.

(4) Assembly of the Handle Member

The above-described structure provides and easily assembled handle cover 10. The method of assembling handle cover 10 is now explained. The handle member includes handle 1, handle cover 10, and meter unit 20 as main members, and handle 1 is connected to the steering shaft, not shown, of the vehicle body.

Before assembling handle cover 10 to the handle member, front side cover 10a and rear side cover 10b, and meter unit 20 are formed independently. Before assembling handle cover 10 to the periphery of handle 1, meter unit 20 is attached to rear side cover 10b. At this time, the cable that extends downward from meter mechanism 23 is passed through hole 15e, and bosses 24a-24c are placed in contact with attachment portions 15a-15c formed in seat 15 of rear side cover 10b, and both members are secured together by screws.

This procedure can be performed before meter unit 20 and rear side cover 10b are assembled to handle 1, and thus the orientation of meter unit 20 and rear side cover 10b can be freely adjusted. As a result, meter unit 20 can be attached to rear side cover 10b with a remarkable degree of ease.

After meter unit 20 and rear side cover 10b are integrated using this procedure, the integrated rear side cover 10b is assembled to handle 1. As a result, the rear side of handle 1 is covered by rear side cover 10b, and meter unit 20 is attached to rear side cover 10b.

Accordingly, the lower surface of mating surface 25 is oriented to have the depth dimension of the determined length in the direction parallel to the front-rear direction of the vehicle when a cut is made along a chosen cross section parallel to the up-down/front-rear direction. Then, front side cover 10a is faced toward rear side cover 10b and then front side cover 10a is moved from the front to the rear side until attachment portions 16a-16f correspond to the positions of attachment portions 12a-12f.

At this time, front side cover 10a is positioned such that mating surfaces 13 and 25 face each other, and then front side cover 10a is moved while ribs 27e-27h of meter unit 20 face attachment portions 14e-14h. Accordingly, front side cover 10a is moved such that mating surface 13 faces mating surface 25, and attachment portions 14e-14h are inserted between ribs 27e-27h and mating surface 25.

As a result, when front side cover 10a and rear side cover 10b are aligned, attachment portions 16a-16f correspond with the positions of attachment portions 12a-12f, and thus front side cover 10a and rear side cover 10b can be accurately aligned by simply moving front side cover 10a from the front to the rear. Then, attachment portions 16a-16f and 12a-12f are used to secure the members using screws, whereby front side cover 10a is simply assembled to rear side cover 10b.

Note that, if the attachment provided by attachment portions 16a-16f and 12a-12f is released, front side cover 10a can be removed while the integrated meter unit 20 and rear side cover 10b are still attached to handle 1. Thus, if front side cover 10a is removed, maintenance of cables and the like provided inside handle cover 10 can be simply performed.

Mating surface 25 corresponds to a second mating surface and a meter unit side mating surface as described in the claims, and mating surface 26 corresponds to a first mating surface as described in the claims. In addition, front side cover 10*a* corresponds to a second handle cover as described in the claims, rear side cover 10*b* corresponds to a first handle cover as described in the claims, and mating surface 13 corresponds to a cover side mating surface as described in the claims.

(5) Other Embodiments

One embodiment of the invention has been described, however, the invention is not so limited For example, meter unit 20 may protrude from upper surface 11 of handle cover 10 in directions other than the direction of axis A, such as further to the rear or to the front of axis A, so long as viewability is enhanced. A structure may be adopted in which meter unit 20 protrudes upward, and lens 22 faces the rider's side.

In addition, the depth dimension of the lower surface of mating surface 25 has been described as oriented in a direction that is parallel with the front-rear direction of the vehicle when a cut is made along a chosen cross section that is parallel with the up-down/front-rear direction. However, the depth dimension may be oriented in another direction. For example, the depth dimension may be inclined such that the rear side is positioned above or below the front side. So long as front side cover 10*a* may be moved in a determined direction in order to align it with rear side cover 10*b*, extremely good workability is ensured regardless of which direction front side cover 10*a* is moved in.

Furthermore, meter unit 20 may be attached to front side cover 10*a*, then front side cover 10*a* with the attached meter unit 20 attached to handle 1, and then following this rear side cover 10*b* attached to front side cover 10*a*. In this case, a mating surface that mates with rear side cover 10*b* is formed in the lower end of the rear side of meter unit 20, and rear side cover 10*b* and front side cover 10*a* can be aligned with each other by just moving rear side cover 10*b* in a determined direction. This structure allows the handle member to be formed using a simple operation.

In addition, in order to promote improved viewability by protruding meter unit 20 out from handle cover 10, handle cover 10 may be segmented in directions other than the front-rear direction, for example, handle cover 10 may be segmented in the up-down, left-right or another direction. So long as a structure is adopted in which meter unit 20 is first attached to one section of handle cover 10, the handle member can be formed using a simple operation.

In addition, attachment by structures other than screws may be used. For example, hook shaped pawls that protrude from the lower section of meter unit 20 may be inserted into holes formed in seat 15 of the side cover 10*b*. Moreover, the straddle-type vehicle may be a vehicle other than a motorbike, for example, a four wheel buggy (an ATV (All Terrain Vehicle)), a snow mobile, or the like.

The particular embodiments of the invention described in this document should be considered illustrative, rather than restrictive. Modification to the described embodiments may be made without departing from the spirit of the invention as defined by the following claims.

The invention claimed is:

1. A straddle vehicle comprising:
    a handle;
    a handle cover that covers the handle; and
    a meter unit that is attached to the handle cover, the meter unit comprising a side surface that extends upward from an upper surface of the handle cover, and a lens that covers a meter formed in an upper section of the side surface, and that has an upper end that is positioned above an upper end of the handle cover.

2. The straddle vehicle according to claim 1, wherein the handle cover comprises a front side cover and a rear side cover, and wherein either the front side cover or the rear side cover includes an attachment portion that is used to attach the meter unit.

3. The straddle vehicle according to claim 2, wherein the attachment portion is formed such that attachment of the meter unit can be performed from an inner side of the handle cover.

4. The straddle vehicle according to claim 2, wherein a meter unit side mating surface, which is oriented in a determined direction, is formed in a lower end of the side surface, and a cover side mating surface is formed in either one of the front side cover and the rear side cover, the cover side mating surface having generally the same shape as the meter unit side mating surface, wherein the cover side mating surface is parallel with the direction of movement of the front side cover and the rear side cover when the covers are aligned.

5. The straddle vehicle according to claim 1, wherein the meter unit side mating surface and the cover side mating surface are parallel with a vehicle front-rear direction when the front side cover and the rear side cover are in an aligned state.

6. The straddle vehicle according to claim 1, and further comprising:
    a steering shaft to which the handle is attached, wherein the meter unit is inclined in a direction in parallel to the steering shaft.

7. An assembly method for assembling a handle member in which a meter unit, and a handle cover comprising a first handle cover and a second handle cover are assembled to a handle of a straddle vehicle, the assembly method comprising:
    forming a first mating surface and a second mating surface on a lower end of the meter unit, the first mating surface forming a boundary with the first handle cover, and the second mating surface forming a boundary with the second handle cover;
    forming a cover side mating surface that faces the second mating surface on the second handle cover;
    attaching the meter unit to the first handle cover while the first mating surface is aligned with an upper surface of the first handle cover;
    attaching the first handle cover with the attached meter unit to the handle; and
    moving the second handle cover in a direction that is parallel to the second mating surface while the cover side mating surface is facing the second mating surface such that the second handle cover is attached to the first handle cover.

8. A handle assembly for a straddle vehicle comprising:
    a handle cover configured to cover a handle of the straddle vehicle, the handle cover comprising a first cover portion and a second cover portion; and
    a meter unit, wherein
    the meter unit is directly secured to the second cover portion but is not directly secured to the first cover portion, and
    the first cover portion is directly secured to the second cover portion.

9. A handle assembly according to claim 8, wherein the meter unit is screwed to the second cover portion, and the first cover portion is screwed to the second cover portion.

10. A handle assembly as claimed in claim 8, wherein the first cover portion is a front side cover and the second cover portion is a rear side cover.

11. A straddle vehicle comprising the handle assembly of claim 8, and further comprising:

a handle, wherein the handle assembly covers the handle; and a steering shaft, wherein the meter unit extends in parallel to the steering shaft.

12. A method for assembling a handle assembly of a straddle vehicle comprising:

providing a handle cover having separate first and second portions;

attaching a meter unit to the second portion of the handle cover;

attaching the assembled meter unit and second portion of the handle cover to a handle; and attaching the first portion of the handle cover to the second portion of the handle cover.

13. A method according to claim 12, wherein the first portion of the handle cover is a front half and the second portion of the handle cover is a rear half.

14. A method according to claim 12, and further comprising:

orienting the meter unit such that the meter unit extends in parallel with a central axis of a steering shaft of the straddle vehicle.

* * * * *